(12) United States Patent
Ross et al.

(10) Patent No.: US 7,610,048 B2
(45) Date of Patent: *Oct. 27, 2009

(54) SYSTEM AND METHOD FOR THE ACCURATE COLLECTION OF END-USER OPINION DATA FOR APPLICATIONS ON A WIRELESS NETWORK

(75) Inventors: David J. Ross, San Diego, CA (US); Jason Kenagy, San Diego, CA (US); Mazen Chmaytelli, San Diego, CA (US); Samir K. Khazaka, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 695 days.

This patent is subject to a terminal disclaimer.

(21) Appl. No.: 10/912,940

(22) Filed: Aug. 6, 2004

(65) Prior Publication Data

US 2005/0009465 A1   Jan. 13, 2005

Related U.S. Application Data

(63) Continuation of application No. 10/187,511, filed on Jul. 1, 2002, now Pat. No. 6,792,244.

(51) Int. Cl.
*H04W 60/00* (2006.01)
(52) U.S. Cl. .................. 455/435.1; 455/418; 455/2.01
(58) Field of Classification Search ............... 455/2.01, 455/403, 405–407, 435.1–435.3, 408, 409, 455/414.1–414.3, 418–420, 423, 425; 705/10; 717/178
See application file for complete search history.

(56) References Cited

U.S. PATENT DOCUMENTS

| | | | | |
|---|---|---|---|---|
| 6,138,009 | A * | 10/2000 | Birgerson | 455/419 |
| 6,151,707 | A * | 11/2000 | Hecksel et al. | 717/178 |
| 6,792,244 | B2 * | 9/2004 | Ross et al. | 455/2.01 |
| 2002/0007303 | A1 * | 1/2002 | Brookler et al. | 705/10 |

FOREIGN PATENT DOCUMENTS

| | | |
|---|---|---|
| JP | 05-219174 | 8/1993 |
| JP | 10-207805 | 8/1998 |
| JP | 2000-187645 | 7/2000 |
| JP | 2001-350897 | 12/2001 |
| JP | 2002-41755 | 2/2002 |

OTHER PUBLICATIONS

International Search Report, PCT/US2003/020911 - International Search Authority - US, Oct. 20, 2003.
International Preliminary Examination Report, PCT/2003/020911 - International Preliminary Examining Authority - US, Apr. 18, 2005.

* cited by examiner

*Primary Examiner*—Philip J Sobutka
(74) *Attorney, Agent, or Firm*—Brent Boyd; Ashish L. Patel

(57) ABSTRACT

A system, method, and computer program for collecting end-user opinions of applications and data in a wireless communications network. The system identifies the end-user who has downloaded software applications and/or data to a wireless device and collects end-user opinion preferably through the transmission of a targeted questionnaire to the wireless device.

44 Claims, 7 Drawing Sheets

SYSTEM AND METHOD FOR THE ACCURATE COLLECTION OF END-USER OPINION DATA FOR APPLICATIONS ON A WIRELESS NETWORK

CROSS-REFERENCE TO RELATED APPLICATIONS

This application is a continuation of U.S. application Ser. No. 10/187,511, filed Jul. 1, 2002, which is now U.S. Pat. No. 6,792,244 and is hereby expressly incorporated by reference herein in its entirety.

BACKGROUND OF THE INVENTION

I. Field of the Invention

This invention generally relates to computer networks and wireless communications. More specifically, the present invention relates to collecting end-user opinions on software applications in a wireless network environment.

II. Description of the Related Art

Collecting end-user opinions is an important way to improve products and can often lead to a greater market penetration. Traditionally, manufacturers of appliances send out surveys with their products and ask consumers about the reasons for which they bought their products, and their opinions about the initial use of the product. However, the direct solicitation method is faulty and presents several shortcomings. The direct solicitation method presents the survey to a buyer before the buyer has a significant opportunity to use the product, and furthermore, there is no certainty the end-user will send the survey back after filling it out.

The methods for collecting end user opinions have changed with the introduction of software merchandises and the Internet. The software applications, either purchased and loaded upon an Internet-connected computer or downloaded across the Internet, often come with a user survey and sometimes the application automatically sends an electronic mail with the opinion and survey information directly back to the manufacturer. Again, this method usually collects only data concerning the end-user's motivation to purchase particular software merchandise, and does not collect the end-user's opinion about the software application itself.

Some websites on the Internet rate consumer products and also collect end-user opinions through interacting with end-users that contact the website. The end-users can activate a screen concerning a particular product and enter their opinions and the opinions are made available to other end-users that access the website. This approach presents several shortcomings in that it does not verify the identity of the end-user entering the opinion and has no way to confirm the user has actually purchased or used the product. Furthermore, this website polling method relies on the initiative from the end-user, instead of proactive actions from the manufacturers.

Accordingly, it would be advantageous to provide a system and method that proactively collects opinions from the end-users who actually have purchased and used the products. If instituted in a limited bandwidth network, such system and method should not add significant cost to the end-user. It is thus to such a system and method for collecting end-user opinions that the present invention is primarily directed.

SUMMARY OF THE INVENTION

The present invention discloses a system, method and program for collecting opinions from end-users who have downloaded applications and data across a wireless network. The system gathers opinion data through proactively sending out questionnaires and surveys to the users, after the users have purchased and used the products for a predefined period, and dispatches the questionnaires and surveys back to a server after the users have filled them out.

In one example, the system can send a questionnaire applet for display on the wireless device to the end-user, and the end-user can enter opinion data at the wireless device. After the user enters opinion data, the wireless device sends the opinion data to a server, which is in communication with the wireless network. The transmission of the questionnaire and the opinion data can be done during the registration procedure of the wireless device when it downloads the application and/or data, or when the wireless device first connects to the wireless network, and thus, become locatable on the wireless network. The process of uploading the questionnaire to the end-user can thus be transparent to the user and not significantly use the communication bandwidth.

The gathering of opinion data can occur based upon several criteria, such as duration after initial download of the application or data, the number of times the application or data has been executed or accessed, or at some other interval such as asking the end-user for an application upgrade or providing an application patch. If the opinion data gathering mechanism, such as a questionnaire, was placed at the wireless device at the time of download, then the predetermined criteria to request end-user opinion data input will be determined at the time of download of the application or data.

In one embodiment, after collecting the opinion data from the end-users, the server can forward the opinion data to application manufacturers for evaluation. The server may require the manufacturers to subscribe to this opinion data collection service. If a manufacturer subscribes to the service, the server can forward the opinion data to the manufacturer immediately after receipt from the end-user. If the manufacturer is not a subscriber, the server can invite the manufacturer to become a subscriber after receiving end-user opinion data for that manufacturer's application.

The present invention therefore provides an advantage in that the questionnaire and the opinion data can be transferred through the wireless communication network without significantly consuming useful bandwidth. The advantageous use of security and identification protocols inherent in a wireless communication network, such as a cellular telecommunication network, ensures that the actual end-user of a software product is identified and presented with the questionnaire for gathering of opinion data. The system and method therefore provide valuable marketing data for manufacturers of applications that are downloaded across the wireless network.

Other objects, advantages, and features of the present invention will become apparent after review of the hereinafter set forth Brief Description of the Drawings, Detailed Description of the Invention, and the claims.

DETAILED DESCRIPTION OF THE INVENTION

Figure 1:
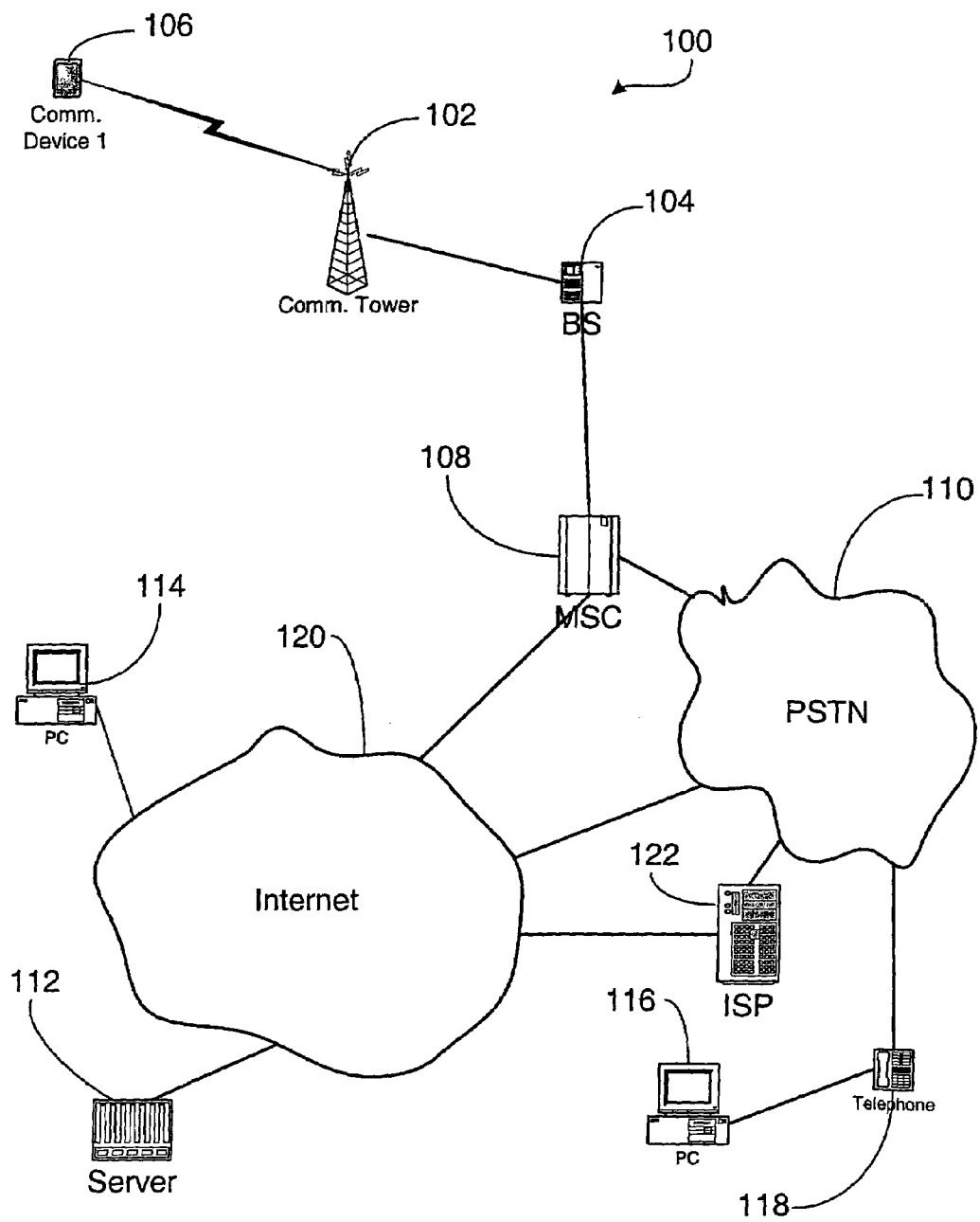
FIG. 1 is an architecture of a communications network.

In this description, the terms "communication device," "wireless device," "hand held telephone," and "handset" are used interchangeably, and like numerals refer to like elements throughout the several views. FIG. 1 depicts a communication network 100 used according to the present invention. The communication network 100 includes a wireless communications network, a public switched telephone network (PSTN) 110, and the Internet 120.

The wireless communication network includes a plurality of communication towers 102, each connected to a base station (BS) 104 and serving users with communication devices 106. The communication devices 106 can be cellular telephones, pagers, PDAs, laptop computers, or other hand-held, stationary, or portable communication device that uses a wireless and cellular telecommunication network. The commands and data input by each user are transmitted as digital data to a communication tower 102. The communication between a user using a communication device 106 and the communication tower 102 can be based on different technologies, such code division multiplexed access (CDMA), time division multiplexed access (TDMA), frequency division multiplexed access (FDMA), global system for mobile communications (GSM), or other protocols that may be used in a wireless communications network or a data communications network. The data from each user is sent from the communication tower 102 to a base station (BS) 104, and forwarded to a mobile switching center (MSC) 108, which may be connected to a public switched telephone network (PSTN) 110.

The PSTN 110 is connected to the Internet 120 and the wireless communication network through a MSC 108. The PSTN 110 supports users accessing the Internet using a computer 116 through dial up services. The user uses the computer 116 and dials through a telephone line 118 to access an Internet service provider (ISP) 122. The ISP 122 provides connection between the user at the computer 116 and the Internet 120. The user may also access directly the ISP 122 through high-speed data connections such as digital subscriber line (DSL), T1 connections, etc.

The Internet 120 is a network of high-speed data network. A user may access the Internet directly by connecting to a hub on the Internet 120 or access through an ISP 120 connected to the Internet 120. A server 112 may be connected directly to the Internet 120, or to the MSC 108, or to the PSTN 110.

Figure 2A:
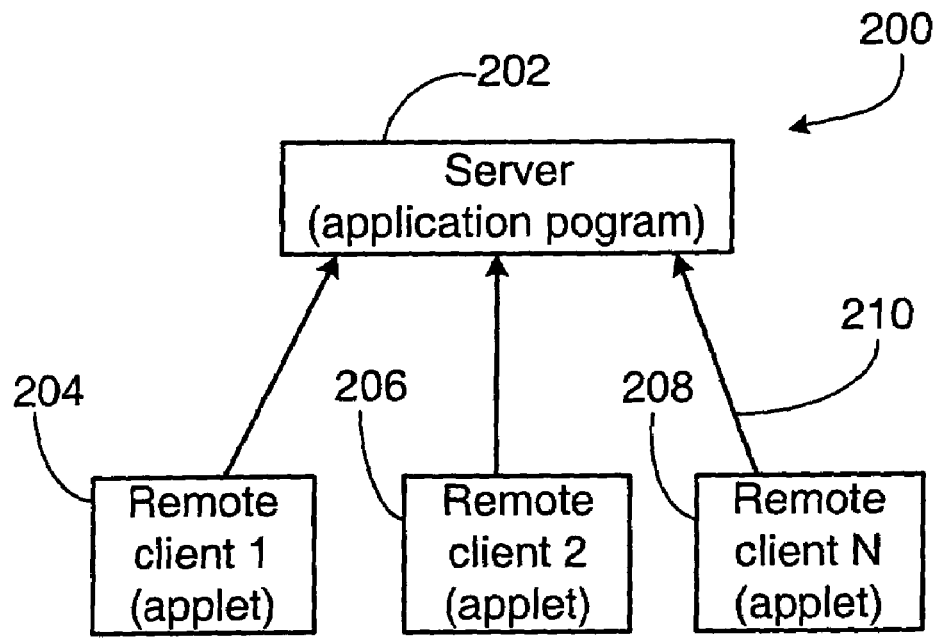
FIG. 2A is an architecture of one embodiment of the system for collecting end-user opinions.

FIG. 2A depicts an architecture 200 of one embodiment of the system for collecting end-user opinion. The server 202 supports the application program that communicates with remote clients 204, 206, and 208. Each remote client may be a communication device 106. Each remote client is loaded with an application applet that controls the interface with users. The application applet can be downloaded to the remote client at the same time when the users downloaded software applications. The application applet may also be downloaded to the remote client by the manufacturer of the remote client when the remote client is manufactured.

The application applet detects when a software application is first installed on the handset and tracks when the software application is used. The application applet prompts a questionnaire to the user after the software application has been installed for a predefined period or used for a predefined number of times. After collecting the user's opinion, the application applet then sends it back to the application program in the server 202 through an upward communication message 210.

The server and the application program are used interchangeably in this description, and the remote client and the application applet are also used interchangeably in this description.

Figure 2B:
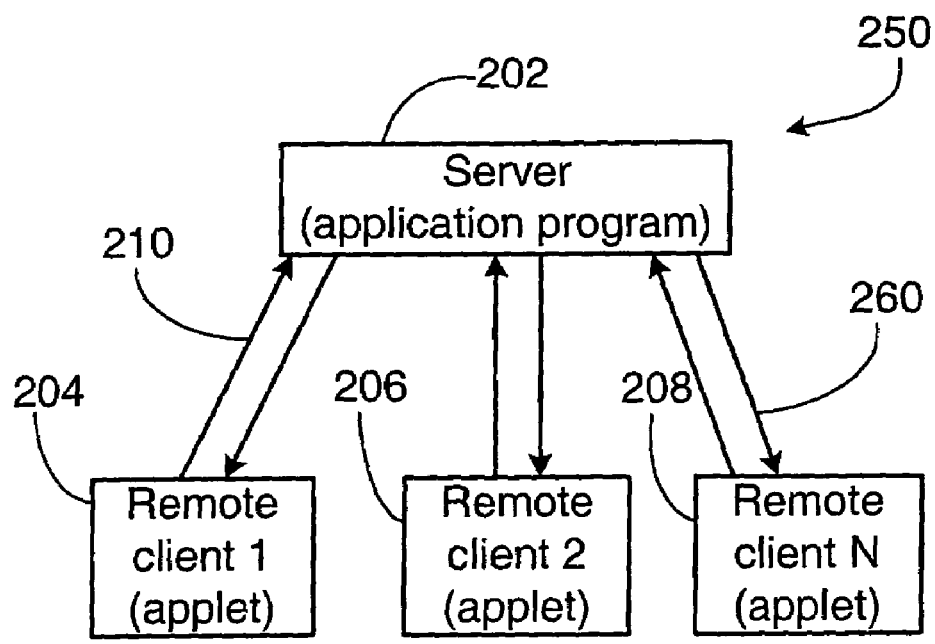
FIG. 2B is an alternate architecture of the system for collecting end-user opinions.

FIG. 2B depicts an architecture 250 of an alternate embodiment of the system for collecting end-user opinion. The server 202 sends the questionnaire through a downward communication message 260 and receives the opinion through an upward communication message 210. The server 202 includes the questionnaire in a downward communication message, which is preferably downloaded to the communication device 106 during the registration procedure after the handset 106 is powered up.

The communication device 106, after powered up goes through a registration procedure with a local wireless service provider. During this registration procedure, the handset transmits its MIN and ESN and requests a communication channel from the wireless communications network. The wireless service provider authenticates the handset through its MIN and ESN and retrieves the user information from the user's home location register (HLR). During this registration procedure, information is transmitted between the handset and the wireless communications network, and additional information such as questionnaires and user opinions can be exchanged in form of data between the handset and the wireless communications network in a manner that is transparent to the user.

The remote client prompts the questionnaire to the user through a display screen after the downward message (data) is received. After the user answers the questionnaire, the opinion (the questionnaire that has been answered) is saved in an upward communication message (data) 210 and sent back to the server 202. The upward communication message is preferably sent back during the next registration procedure. By taking advantage of communication cycle during the registration procedure, the transmission of these messages can be done with minimal consumption of bandwidth and no air time cost (user air time).

Figure 3:
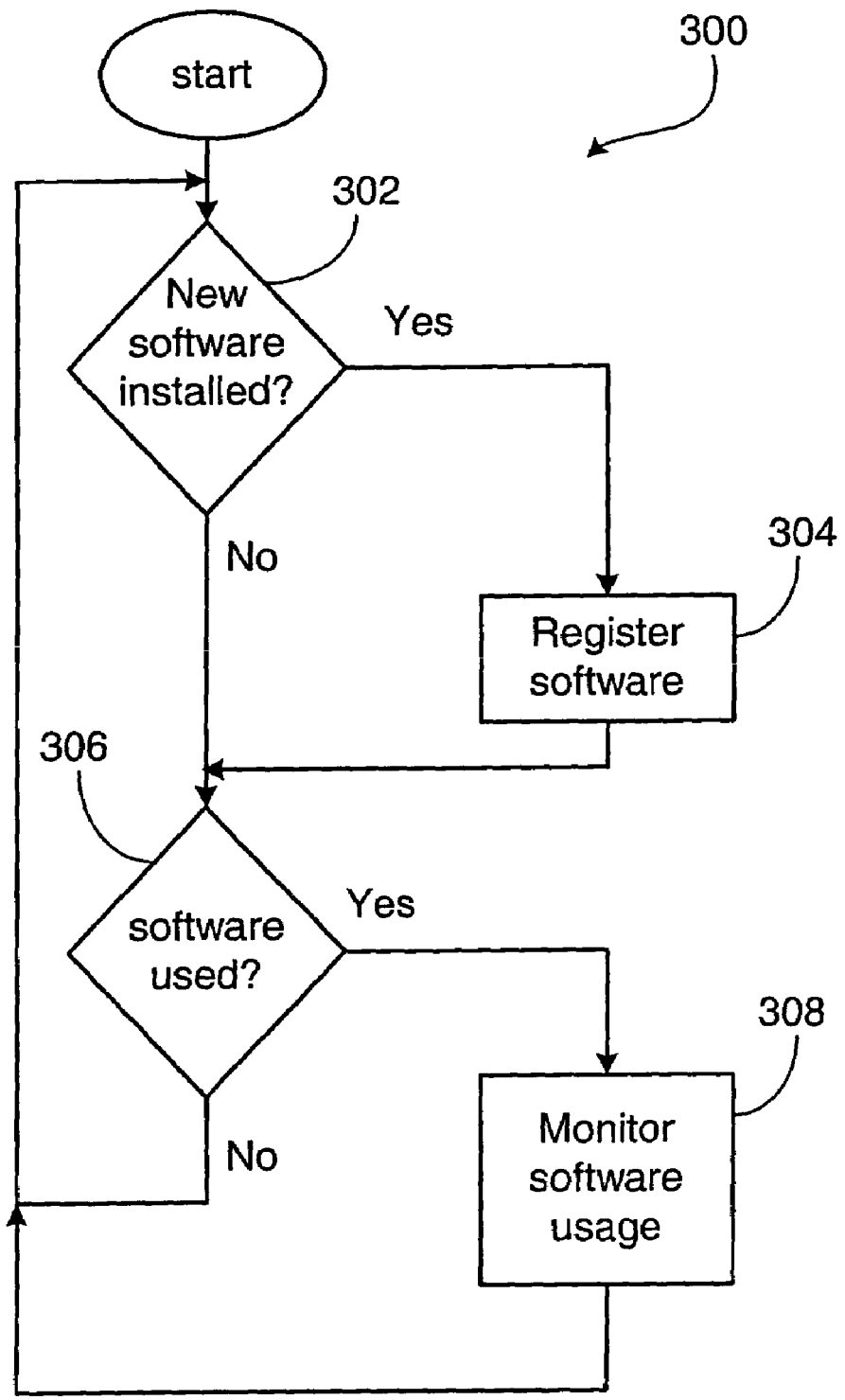
FIG. 3 is a flow chart of an applet process collecting end-user opinion.

FIG. 3 illustrates one embodiment of an applet process 300 to collect end-user opinion. The application applet performs this applet process 300 in a continuous cycle after it is started. The applet checks whether a new software application has been installed on the client 204, step 302. The apple checks for the new software application by checking the registry on the client or by receiving a notification from the system running on the client 204. If the applet detects a new software application has been installed, the applet registers the software application in its record database, step 304. The applet also checks whether a registered software application has been used, step 306. The applet detects a registered software application has been activated by receiving a notification from the client 204. If the applet detects a registered software application has been activated, the applet monitors the usage, step 308. The applet monitors the usage by increasing a counter or recording the length of time the software application is activated.

Figure 4:
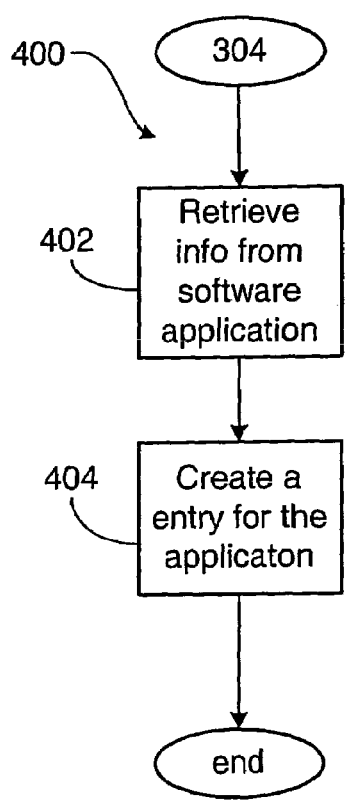
FIG. 4 is a flow chart for registering software applications for which end-user opinion will ultimately be obtained.

FIG. 4 is an illustration of step 304 of FIG. 3. When the applet detects a new software application has been installed on the client, the applet retrieves the information about the software application, step 402, and creates an entry in its record database for the software application, step 404. The information about the software application may include the name of the software application, the manufacturer, the date of the installation, etc.

Figure 5:
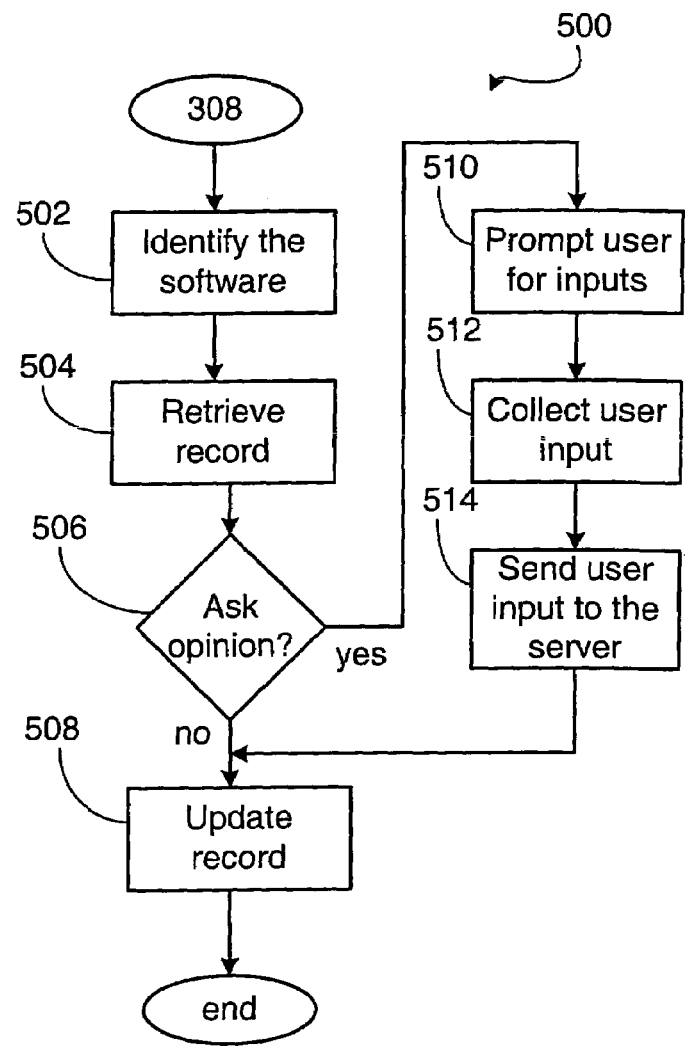
FIG. 5 is a flow chart for monitoring software usage.

FIG. 5 is an illustration of step 308 of FIG. 3. After the applet detects a software application has been activated, the applet identifies the software application, step 502, and retrieves from a record database a record corresponding to the software application, step 504. The applet checks whether it is time to ask the user to provide his opinion about the software application, step 506. The applet will prompt a questionnaire to the user if the record indicates that the number of times the user has used the software application has exceeded a threshold number of executions or some other criteria, such as elapse of duration after initial download of the application or data, the number of times the application or data has been executed or accessed, or at some other interval such as asking the end-user for an application upgrade or providing an application patch.

The threshold number can be predefined by the manufacturer of the software application or the application program on the server 112. The criteria can also be a time period preset by the software manufacturer or the application program. The software manufacturer may decide to only collect user opinions after the user has used the software application for one month or at least 50 times, for example. The threshold number or criteria may be adjusted through the application program on the server. The applet will then prompt for user opinion only when the threshold number has been exceeded or a threshold event has occurred.

If the record indicates that the threshold number has not been reached, the applet updates the record database, step 508, without prompting the questionnaire to the user. If the record indicates that the threshold number has been reached or exceeded, the applet prompts the questionnaire to the user and asks for user input, step 510. The user input is collected, step 512, and the applet includes the user input (end-user opinion data) in a message that is sent to the application program in the server, step 514. After sending the message with the user opinion to the server, the applet updates its table so no additional questionnaire for this software application is prompted to the user in the future. The questionnaire can ask any relevant data for the application, such as user like or dislike, likelihood to download another application, or any other marketing questions that would be known to those of skill in the art in marketing to gather valuable end-user opinion data.

Figure 6:
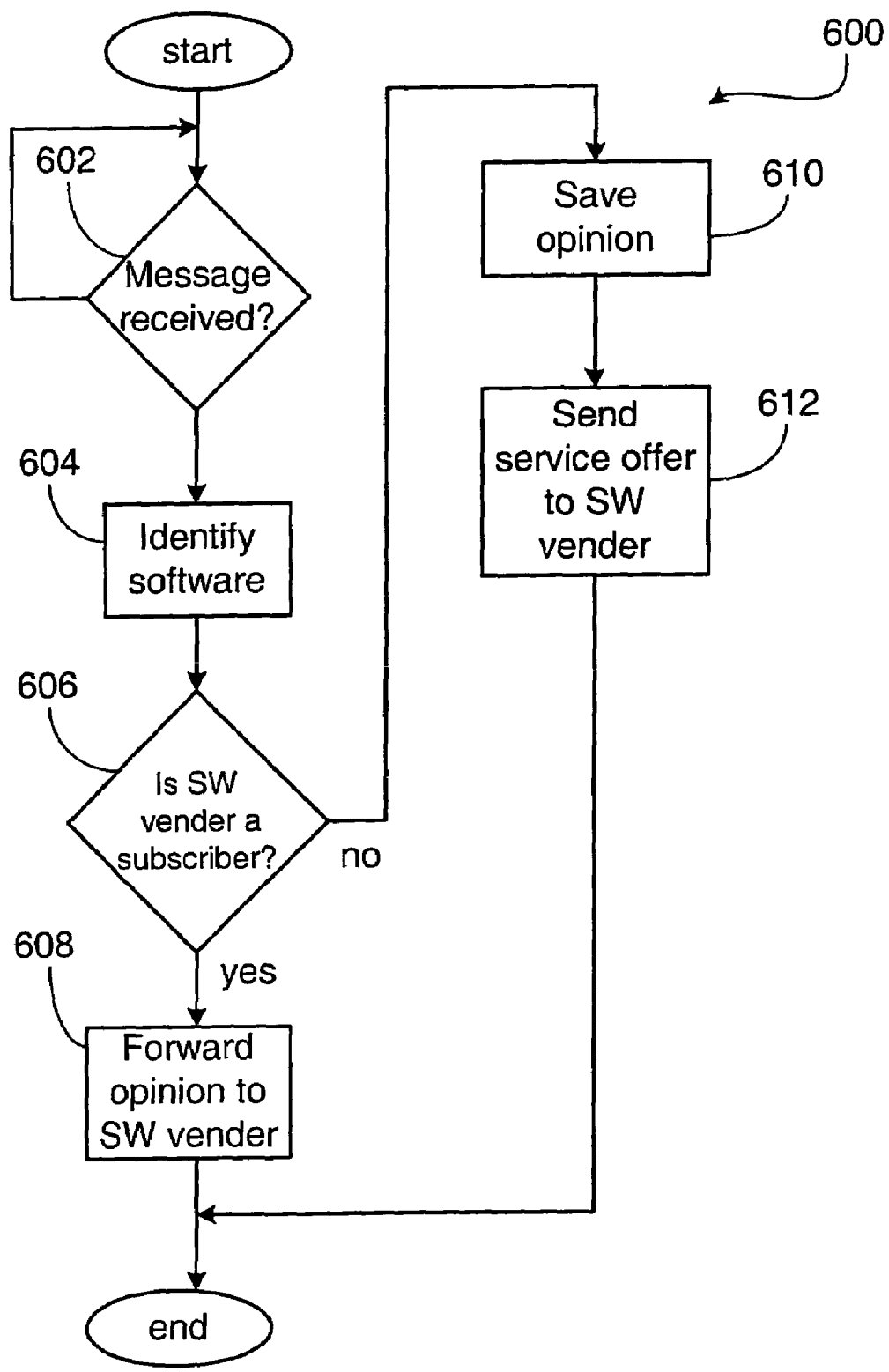
FIG. 6 is a flow chart for a server process to collect end-user opinions from the remote devices using applications.

FIG. 6 is a flow chart for a server (application program) process 600. The server process determines continuously whether a message has been received, step 602, and, when a message is received, the server process checks the identity of the software application, step 604. The server may support different software applications and identify each software application through the identification information in the message received. After identifying the software application, the server checks whether the software application's manufacturer (vendor) is a subscriber of the server's service, step 606. If the software manufacturer is a subscriber, the server forwards the message with the opinion to the software manufacturer, step 608. If the software manufacturer is not a subscriber of the server's service, the server saves the opinion, step 610, and sends a service offer to the software manufacturer, step 610.

Figure 7:
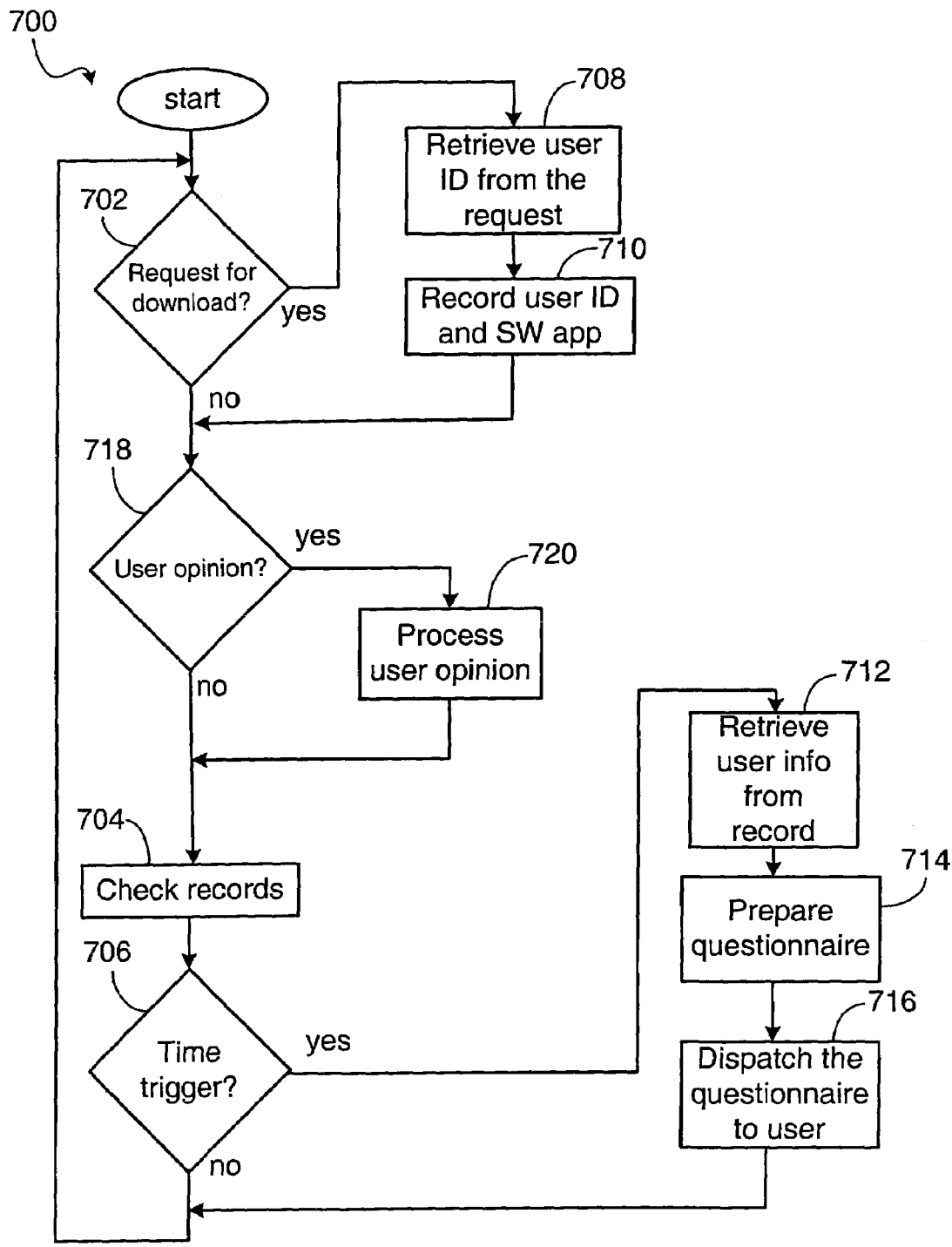
FIG. 7 is a flow chart for an alternate server process to collect end-user opinions from the remote devices using applications.

FIG. 7 is a flow chart for an alternate server process 700. The server process 700 is particularly suited for a system in which the user uses the handset to access the server for downloading the software application. The server receive, a message from the handset and checks whether it is a request for download, step 702. If it is a request for download, the server retrieves the user identification information from the message, step 708, and records the user identification information and the software application requested, step 710.

If the message is not a request for downloading software applications, the server checks whether the message is a user opinion dispatched by the handset, step 718. If the message is a user opinion, the server proceeds to process the user opinion, step 720.

The server also checks its record database for expired times stamps, step 704, if there is any record with an expired time stamp, step 706. The server associates a time stamp with each request record, and, when the time stamp for a record expires, the server sends a questionnaire to the user who requested that software application. This time stamp ensures that the user is given enough time to use the software application before asking his opinion about the software application.

If there is an expired time stamp, the server retrieves the user information from the record, step 712, and prepares a questionnaire, step 714. The questionnaire can be tailored to each individual software application, and the server prepares the questionnaire according to the software application information in the record. After preparing the questionnaire, the server dispatch the questionnaire to the user, step 716.

Figure 8:
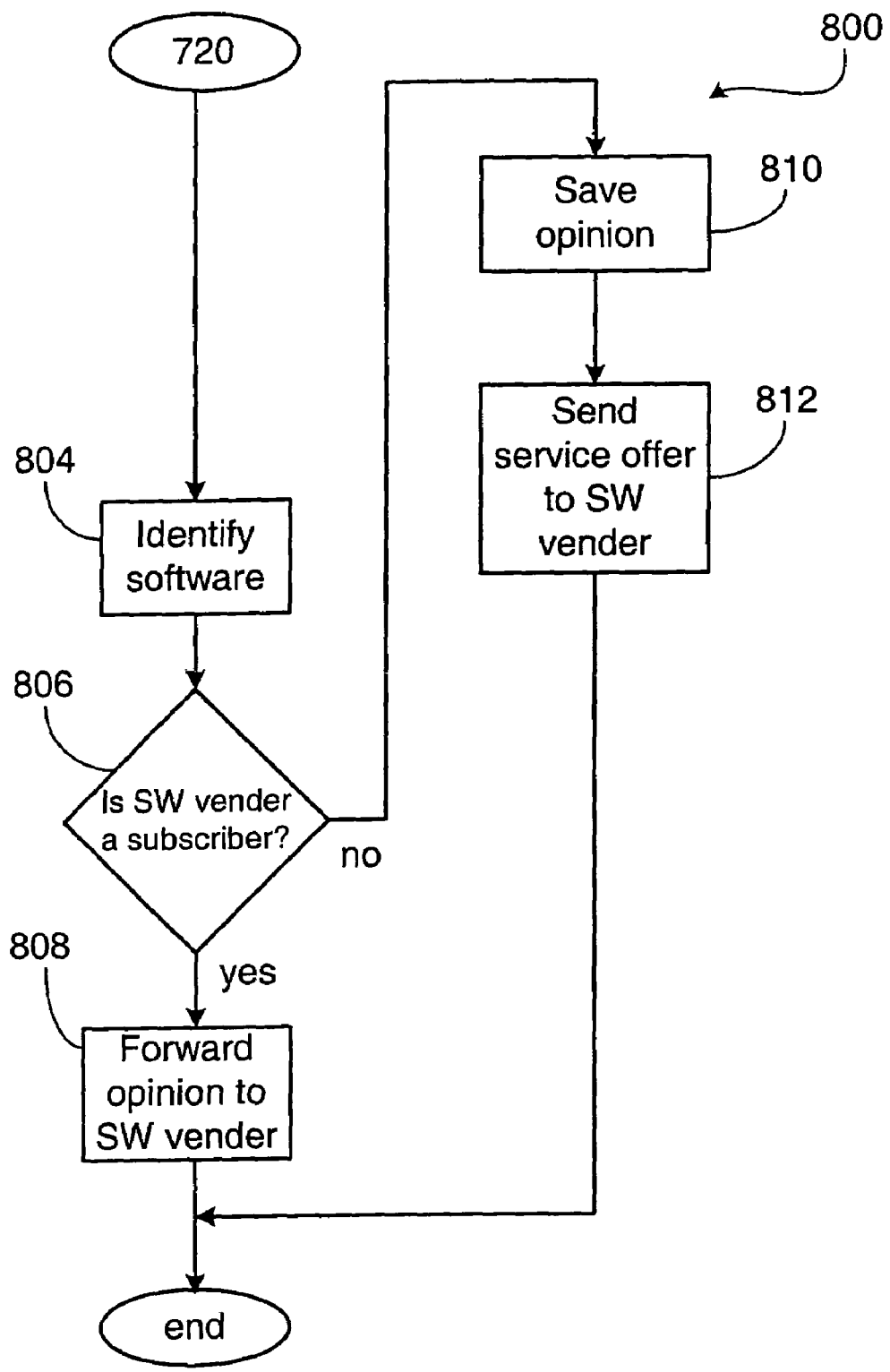
FIG. 8 is a flow chart for processing gathered end-user opinion.

FIG. 8 is an expansion of step 720 of FIG. 7 for processing user opinions. The process is similar to that of FIG. 6. The server identifies the software application that the user opinion is applied to, step 804, and checks whether the software vendor for the software application is a subscriber, step 806. If the software vendor is a subscriber, the server forwards the user opinion to the software vendor, step 808. If the software vendor is not a subscriber of the user opinion collection service, the server saves the opinion, step 810, and sends a service offer to the software vendor, step 812.

The method is executable on the computer platform of a computer device, and thus, the steps are implementable with a program resident in a computer readable medium, where the program directs a server or other computer device having a computer platform to perform the steps of the method. The computer readable medium can be the memory of the application download server 112, or can be in a connective database thereto. Further, the computer readable medium can be in a secondary storage media that is loadable onto a wireless device computer platform, such as a magnetic disk or tape, optical disk, hard disk, flash memory, or other storage media as is known in the art.

In the context of FIGS. 3-8, the method may be implemented, for example, by operating portion(s) of the wireless network to execute a sequence of machine-readable instructions, such as communication device 106, or application download server 112. The instructions can reside in various types of data storage primary, secondary, or tertiary media. The media may comprise, for example, RAM (not shown) accessible by, or residing within, the components of the wireless network. Whether contained in RAM, a diskette, or other secondary storage media, the instructions may be stored on a variety of machine-readable data storage media, such as DASD storage (e.g., a conventional "hard drive" or a RAID array), magnetic tape, electronic read-only memory (e.g., ROM, EPROM, or EEPROM), flash memory cards, an optical storage device (e.g. CD-ROM, WORM, DVD, digital optical tape), paper "punch" cards, or other suitable data storage media.

The system and method thus provide an efficient manner to collect end-user opinion in a wireless communication environment. The following is a description of an exemplary use scenario of a user downloading a software application for his handheld communications device. The user may use his handset to dial into a server 112 to download a calendar application for his handset 108, and the user may do this by dialing a number associated with an application program in the server 112. The call from the handset 108 is received by the communication tower 102, passed through the base station 104, and processed by the MSC 108. The MSC 108 forwards the call to the server 112, which may be connected to the MSC 108 or to the Internet 120.

The server 112 receives the call from the user and activates the application program. The application program identifies the user by user's MSN and/or ESN associated with the handset 108. The application program displays a list of software applications available for download, and the end-user chooses a calendar application, for example, for downloading. The server sends the software application (calendar application) to the handset 108. The server can include an applet to download to the handset, and the applet will then monitor the usage of the software application. The applet can also be installed by the handset's manufacturer and already resident in the handset. The applet will be responsible for prompting the end-user for his opinion about the software application after the end-user has used the software application for a predefined period or a predetermined number of times.

After collecting the end-user opinion data, the applet sends the end-user opinion data via the wireless communications network back to the server during next registration period, thus making the transmission transparent to the user. When the MSC 108 receives the end-user opinion data from the handset 108, the MSC 108 identifies the server 112 as the destination through embedded information received from the handset 108, and forwards the end-user opinion data to the server 112.

The server 112 receives the end-user opinion data and identifies the software application. The server 112 identifies the software application and its manufacturer and checks whether the software manufacturer has subscribed to the user opinion collection service. If the software manufacturer is a subscriber, the server forwards the user opinion to the software manufacturer or processes the user opinion according to the software manufacturer's instructions. If the software manufacturer is not a subscriber, then the server sends a service offer to the software manufacturer with an indication that some user opinions have been received by the server.

In an alternate embodiment, the server 112 does not include the applet when sending the software application to the handset 108. Instead, the server 112 records the user information obtained from the automatic number identification (ANI) associated with the call from the handset 106. The server 112 also records the software application requested by the user and a time stamp associated with the user's request.

The server 112 checks periodically its record database for expired time stamps. When an expired time stamp is found, the server 112 identifies the software application and the user associated with the expired time stamp. The server 112 prepares an applet with a questionnaire and sends the applet with the user information to the MSC 108. The MSC 108 does not forwards the applet until the next registration request by the user.

When the user requests a registration from the MSC 108, the handset 108 identifies itself by the MSN and ESN. The MSC 108 then retrieves the applet with the questionnaire and sends it to the handset 108 during the registration procedure.

After the handset 108 receives the applet, the applet prompts the user for his opinion. The applet collects the opinion and sends it back to the server 112 in the next registration procedure. The server 112 processes the user opinion in the same way described above.

The system and method therefore create a new revenue source for mobile communications service providers and other independent software service providers. The user opinion collection service can be charged by subscription or per opinion delivered. The system can easily support software applications that run on a computing device connected to the Internet or a PSTN. For a user on a computing device, the server 112 identifies the user by either his email address or his network address (TCP/IP address). The server collects the user opinion by sending email to the user inviting his to visit a specific website or replying to the email itself. The server may also communicate with the user through instant messaging services.

While the invention has been particularly shown and described with reference to a preferred embodiment thereof, it will be understood by those skilled in the art that various changes in form and detail maybe made without departing from the spirit and scope of the present invention as set for the in the following claims. Furthermore, although elements of the invention may be described or claimed in the singular, the plural is contemplated unless limitation to the singular is explicitly stated.

The invention claimed is:

1. A system for collecting opinion from an end-user of a wireless device on a wireless communications network, the system comprising:
    a wireless communications network;
    a wireless communications device in communication with the wireless communications network, the wireless communications device collecting end-user opinion after the end-user has used a software application for a predetermined period, the opinion being sent by the wireless communications device to the wireless communications network during a registration procedure of the wireless communication device with the wireless communication network; and
    a server in communication with the wireless communications network, the server running an application that receives the end-user opinion from the wireless communications network.

2. The system according to claim 1, wherein the wireless communication device uses an applet to collect end-user opinion and the server transmits the applet to the wireless communications device during the registration procedure.

3. The system according to claim 2, wherein the wireless communications device selects and receives a software application from the server for which the end-user will provide an opinion.

4. The system according to claim 3, wherein the wireless communications network transmits the applet to the wireless communications device when transmitting the software application to the wireless communications device.

5. The system according to claim 1, wherein the server further comprises a record database of end-user opinion.

6. A system for collecting opinion from an end-user using a wireless communications network, the system comprising:
    a wireless communications means for communicating with a wireless communications network; and
    an end-user opinion collection means for collecting end-user opinion after the end-user has used a software application for a predetermined period,
    wherein the wireless communications means transmits the end-user opinion to the wireless communications network during a registration procedure of the wireless communication means with the wireless communications network.

7. The system according to claim 6, further comprising a storage means for storing the collected end-user opinions.

8. A method for collecting opinion from an end-user of a software application, the method comprising the steps of:
connecting to a server;
receiving the software application from the server;
using the software application;
detecting a threshold event has occurred for the software application usage;
prompting a questionnaire to the end-user;
collecting the opinion from the end-user; and
transmitting the opinion to the server during a registration procedure of a wireless device having the software application.

9. The method according to claim 8, further comprising the step of connecting to a wireless communications network.

10. The method according to claim 8, further comprising the step of connecting to a high-speed data network.

11. The method according to claim 8, further comprising the step of recording usage of the software application in a record.

12. The method according to claim 11, wherein the step of detecting further comprises the step of comparing the record against a threshold number of application uses.

13. The method according to claim 8, further comprising the step of recording the specific time of installation of the software application in a record.

14. The method according to claim 13, wherein the step of detecting further comprises the step of comparing the installation time against the current time.

15. The method according to claim 8, wherein the step of prompting a questionnaire to the end-user is prompting a questionnaire to the end-user though an applet from the server.

16. The method according to claim 15, wherein the step of prompting occurs during a registration procedure.

17. A server for selectively downloading applications and data to wireless devices across a wireless network, the server collecting opinion data from an end-user at a wireless device after the end-user has downloaded software application or data and used the application or data for a predetermined period, the opinion data being sent by the wireless device to the server through the wireless network during a registration procedure of the wireless device with the wireless network.

18. The server according to claim 17, wherein the server transmits an applet to the wireless device to have the end-user input and transmit opinion data to the server.

19. The server according to claim 17, wherein the server indicates which served applications and data the end-user will be requested to provide an opinion for if downloaded.

20. The server according to claim 18, wherein the server transmits the applet to the wireless device when downloading the software application or data to the wireless communications device.

21. The server according to claim 17, wherein the server further comprises a record database of end-user opinion.

22. A computer program resident in a computer readable medium, that when executed, directs a computer in communication with a wireless network to perform the steps of:
selectively downloading an application to a wireless device across the wireless network;
recording the identity of the end-user to which the application was downloaded;
requesting the end-user provide opinion data for the downloaded application; and
receiving opinion data from the end-user during a registration procedure of the wireless device with the wireless network.

23. The program according to claim 22, further directing the computer to perform the step of connecting to a wireless communication network prior to selectively downloading an application to a wireless device across the wireless network.

24. The program according to claim 22, further directing the computer to perform the step of identifying the end-user by an electronic serial number.

25. The program according to claim 22, further directing the computer to perform the step of identifying the end-user by a network address.

26. The program according to claim 22, wherein the step of requesting the end-user provide opinion data for the downloaded application is requesting opinion data through sending a questionnaire to the wireless device of the end-user as a data message.

27. The program according to claim 22, wherein the step of requesting the end-user provide opinion data for the downloaded application is requesting opinion data through sending a questionnaire to the wireless device of the end-user as instant message.

28. The program according to claim 22, further directing the computer to perform the step of recording the opinion data from the end-user.

29. The program according to claim 28, further directing the computer to perform the step of recording the opinion data from the end-user in a remote database.

30. A computer program embodied on a computer readable medium, the computer program capable of executing on a computing device, the computer program comprising:
code operable to register a wireless communications device with a wireless communications network;
code operable to transmit identification information from the wireless communications device to the wireless communications network;
code operable to transmit data from the wireless communications network to the wireless communications device, the data including at least a questionnaire, and the code is further operable to transmit the data during a first registration procedure of the wireless communications device with the wireless communications network;
code operable to prompt the questionnaire to the end-user on a display screen;
code operable to collect opinion from the end-user; and
code operable to transmit the opinion from the wireless communications device to the wireless communication network, the code further operable to transmit the opinion during a second registration procedure.

31. A method for collecting opinion from an end-user using a wireless device on a wireless network, the method comprising the steps:
selectively downloading an application to a wireless device across the wireless network;
recording the identity of the end-user to which the application was downloaded;
requesting the end-user provide opinion data for the downloaded application;
receiving opinion data from the end-user transmitted by the wireless device during a registration procedure of the wireless device with the wireless network;
identifying a software manufacturer for the downloaded software application;

determining whether the software manufacturer is a subscriber; and if the software manufacturer is a subscriber, sending the end-user opinion data to the software manufacturer, the opinion data received for the specific application of that software manufacturer.

32. A computer program embodied on a computer readable medium, the computer program capable of executing on a computing device, the computer program comprising:

code operable to selectively download an application to a wireless device across the wireless network;

code operable to record the identity of the end-user to which the application was downloaded;

code operable to request the end-user provide opinion data for the downloaded application;

code operable to receive opinion data from the end-user transmitted by the wireless device during a registration procedure of the wireless device with the wireless network;

code operable to identify a software manufacturer for the downloaded software application;

code operable to determine whether the software manufacturer is a subscriber; and code operable, wherein if the software manufacturer is a subscriber, to send the end-user opinion data to the software manufacturer, the opinion data received for the specific application of that software manufacturer.

33. A method for collecting opinion from an end-user using a wireless device on a wireless communications network, the method comprising the steps of:

receiving wireless device identification information from a wireless device via the wireless communications network during a first wireless device registration procedure; and transmitting data, including at least a questionnaire, to the wireless communications device via the wireless communications network during the first wireless device registration procedure.

34. The method according to claim 33, further comprising the step of receiving opinion information associated with the questionnaire via the wireless communication network during a second registration procedure.

35. A method for collecting opinion from an end-user using a wireless device on a wireless communications network, the method comprising the steps of:

transmitting wireless device identification information via a wireless communications network during a first wireless device registration procedure with the wireless communications network;

receiving data, including at least a questionnaire, via the wireless communications network during the first wireless device registration procedure;

displaying the questionnaire on a display screen; and collecting opinion from the end-user.

36. The method according to claim 35, further comprising the step of transmitting the opinion from the wireless communications via a wireless communication network, the opinion being transmitted during a second registration procedure.

37. A server used for collecting opinion from an end-user using a wireless communications network, the system comprising:

means for receiving wireless device identification information from a wireless device via the wireless communications network during a first wireless device registration procedure; and means for transmitting data, including at least a questionnaire, to the wireless communications device via the wireless communications network during the first wireless device registration procedure.

38. The server according to claim 37, further comprising means for receiving opinion information associated with the questionnaire via the wireless communication network during a second registration procedure.

39. A client wireless device for collecting opinion from an end-user, comprising:

means for transmitting wireless device identification information via a wireless communications network during a first registration procedure;

means for receiving data, including at least a questionnaire, via the wireless communications network during the first registration procedure;

means for displaying the questionnaire; and means for collecting opinion from the end-user.

40. The client wireless device according to claim 39, further comprising logic means for transmitting the opinion via a wireless communication network, the means for transmitting the opinion further configured to transmit the opinion during a second registration procedure.

41. A computer program embodied on a computer readable medium, the computer program capable of executing on a computing device, the computer program comprising:

code operable to receive wireless device identification information from a wireless device via the wireless communications network during a first wireless device registration procedure; and code operable to configured to transmit data, including at least a questionnaire, to the wireless communications device via the wireless communications network during the first wireless device registration procedure.

42. The computer program according to claim 41, further comprising code operable to receive opinion information associated with the questionnaire via the wireless communication network during a second registration procedure.

43. A computer program embodied on a computer readable medium, the computer program capable of executing on a computing device, the computer program comprising:

code operable to transmit wireless device identification information via a wireless communications network during a first registration procedure;

code operable to receive data, including at least a questionnaire, via the wireless communications network during the first registration procedure;

code operable to display the questionnaire on a display screen; and code operable to collect opinion from the end-user.

44. The computer program according to claim 43, further comprising code operable to transmit the opinion via a wireless communication network, the code further operable to transmit the opinion during a second registration procedure.

* * * * *

UNITED STATES PATENT AND TRADEMARK OFFICE
CERTIFICATE OF CORRECTION

PATENT NO. : 7,610,048 B2 Page 1 of 1
APPLICATION NO. : 10/912940
DATED : October 27, 2009
INVENTOR(S) : Ross et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1310 days.

Signed and Sealed this

Twelfth Day of October, 2010

David J. Kappos
*Director of the United States Patent and Trademark Office*